United States Patent [19]

Andre

[11] 4,125,917
[45] Nov. 21, 1978

[54] MOLDING CLAMP

[75] Inventor: Guy Andre, Grenoble, France

[73] Assignee: A. Raymond, Loerrach, Fed. Rep. of Germany

[21] Appl. No.: 805,456

[22] Filed: Jun. 10, 1977

[30] Foreign Application Priority Data

Jun. 9, 1976 [DE] Fed. Rep. of Germany ....... 2626500

[51] Int. Cl.² ........................ B60R 13/02; E04F 19/02
[52] U.S. Cl. .................................. 24/73 FT; 52/718; 296/93
[58] Field of Search ................. 24/73 R, 73 FT, 73 P, 24/73 PC, 73 PF, 73 PM; 296/93; 52/403, 718

[56] References Cited

U.S. PATENT DOCUMENTS

| 3,775,927 | 12/1973 | Meyer | 52/718 |
| 3,856,194 | 12/1974 | Helm | 52/718 X |
| 3,860,999 | 1/1975 | Meyer | 24/73 FT |

FOREIGN PATENT DOCUMENTS 657,791  9/1951  United Kingdom ...................... 52/718

Primary Examiner—Louis K. Rimrodt
Attorney, Agent, or Firm—Finnegan, Henderson, Farabow & Garrett

[57] ABSTRACT

Disclosed is a molding clamp for securing trim molding to a support body. The clamp includes a base having gripping heads along its opposite sides connected to the base by flat elastic strips. One side of the base includes a rivet for securing the clamp to the support body. The gripping heads are movable toward the base upon application of the molding to the clamp and engage the molding to retain it on the clamp under the bias of the strips. The gripping heads and base have cooperating flanges which relieve bending stresses on the elastic strips in a direction normal to the clamp and support body when the molding is secured to the clamp and support body.

10 Claims, 3 Drawing Figures

MOLDING CLAMP

The present invention relates to a molding clamp and particularly relates to a one-piece plastic clamp for securing molding to a support plate.

Various molding clamps have been proposed and constructed in the past for fastening moldings or hollow trim along the sides of vehicle bodies. Such clamps have been found particularly useful in fastening small, lightweight, narrow moldings to vehicle bodies. However, with respect to heavier or wider moldings, for instance those used in buses and trucks, the anchoring force of these known clamps in inadequate to maintain the strip permanently secured to the walls of the vehicle body. Furthermore, the greater rigidity of the larger moldings requires more accurate alignment of the fastening holes in vehicle body. Otherwise special means for aligning the clamps such that the gripping heads engageable with the molding are located at the same height. This, however, requires considerable labor and expenditure of time.

Accordingly, it is a primary object of the present invention to provide a novel and improved molding clamp.

It is another object of the present invention to provide a novel and improved molding clamp particularly useful for mounting heavy and/or wide moldings to vehicle bodies.

It is still another object of the present invention to provide a novel and improved molding clamp which ensures that the molding is tightly secured to the clamp and to the vehicle body.

It is a further object of the present invention to provide a novel and improved molding clamp formed of a unitary plastic construction and which clamp is readily, easily and economically molded.

It is a still further object of the present invention to provide a novel and improved molding clamp which facilitates and enables ready and easy securement of the molding to the vehicle body and with little expenditure or force.

It is a still further object of the present invention to provide a novel and improved molding clamp for mounting to a vehicle body wherein the molding can be readily mounted even in the event the mounting holes in the body are misaligned.

To achieve the foregoing objects and in accordance with the purpose of the present invention, as embodied and broadly described herein, the molding clamp hereof comprises a base, means carried by the base for securing the clamp to the support, a pair of heads carried by the base for gripping the molding, means elastically connecting each of the heads and the base enabling the molding to move the heads toward the base against the bias of the elastic means upon application of the molding to the clamp and enabling the heads to subsequently grip the molding under the bias of the elastic means to secure the molding to the support, the base, heads and elastic means being molded integrally of a plastic material.

Preferably, the elastic means includes elongated plastic strips connecting between the heads and the base and which are bent to enable the strips to flex upon movement of the heads toward and away from the base. The strips are preferably flat in a direction perpendicular to the support body to reinforce and improve the strength of the clamp. Also, to relieve the bending moments on the strips when the molding is secured to the clamp and support body, the heads and base lie in a common plane with the heads being locked against movement away from the support body. Particularly, the base has a pair of outwardly directed flanges in lateral opposition to the respective heads and which flanges are normally spaced from the heads and from the support to define recesses therewith. The heads have inwardly directed flanges in lateral opposition to the respective recesses, the head flanges being movable into the recesses upon application of the molding to the clamp for locking the heads against the base flanges and against substantial movement in a direction normal to the plate and support body.

These and other objects and advantages of the present invention will become more apparent upon reference to the following specification, appended claims and drawings, wherein:

Reference will now be made in detail to the present preferred embodiment of the invention, an example of which is illustrated in the accompanying drawings.

Figure 1:
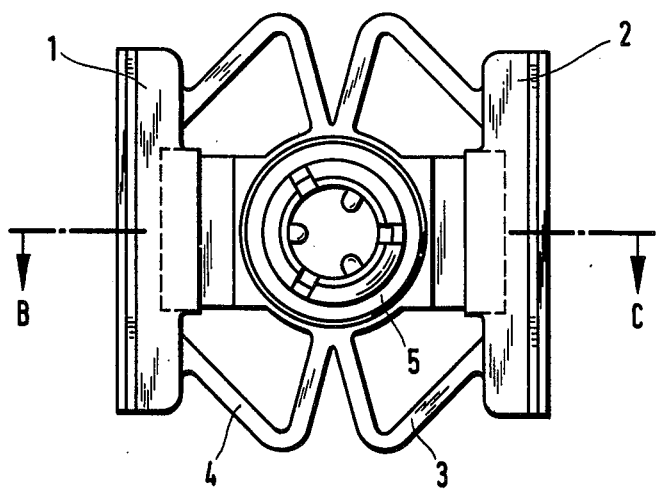
FIG. 1 is a top plan view of a molding clamp constructed in accordance with the present invention and viewed in the direction A illustrated in FIG. 2.
Figure 2:
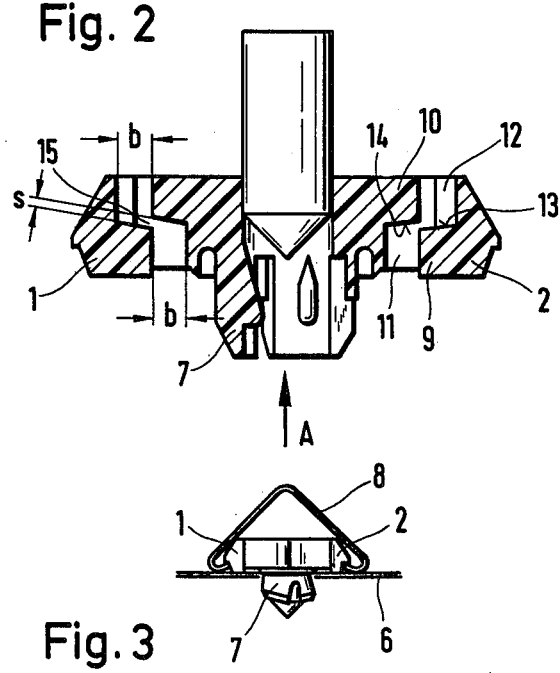
FIG. 2 is a vertical cross-sectional view thereof along the line B–C in FIG. 1.
Figure 3:
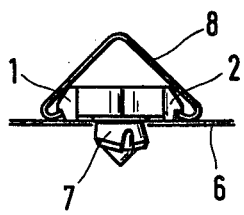
FIG. 3 is a reduced end view of the clamp illustrated in normal size and secured to the sheet metal with the molding mounted thereon.

Referring now to FIGS. 1 and 2, the molding clamp is preferably formed of a plastic material and comprises two generally parallel gripping heads 1 and 2 for the purpose of securing a molding 8 to a support plate 6, for example for securing a trim molding of a vehicle to the vehicle body or support plate 6. Gripper heads 1 and 2 are flexibly elastically connected on opposite sides of and to an anchoring part of base 5 by means of two connecting elements or flat strips 3 and 4. As illustrated in FIG. 3, base 5 has a spreading rivet fastener 7 for fastening the clamp onto a support plate 6, for example the sheet metal of a vehicle body. The spreading rivet fastener 7 is conventional in construction and, when inserted into prepared openings in the sheet metal support plate, can be spread by application of the tool illustrated in FIG. 2. Obviously, other types of fasteners such as press fasteners or screws may also be used to secure the clamp to the vehicle body.

Connecting strips 3 and 4 are preferably formed by inwardly bent flat bars perpendicular to support plates 6 and are formed in a single mold with the gripper heads 1 and 2, and base 5. Connecting strips 3 and 4 each comprise a first linearly extending portion which extends from the base toward the side of the clamp between the heads and a second linearly extending portion which extends from the outer terminus of the first linearly extending portion toward the head to which it is connected. These strips 3 and 4 elastically flex upon movement of the associated head toward and away from the base. Consequently, when molding 8 is applied to the clamp, the tapered surfaces along the outer edge of the gripping heads permit inward movement of the gripping heads against the bias of strips 3 and 4 such that the edges of the molding move past the tips of the heads. Once past these tips, the heads flex or move outwardly under the natural bias of the strips 3 and 4 to engage the edges of the molding and retain the molding on the clamp and against support surface 6.

As illustrated in FIG. 2, each gripping head 3 and 4 is provided with a step or flange 9 on the lower side thereof facing base 5 while a similar step or flange 10 is located on the opposite side of base 5 and on the upper half of the clamp. When the gripping heads 1 and 2 are displaced toward base 5, flanges 9 and 10 move into the corresponding recesses 11 and 12. The width "b" of these recesses are the same. Thus flanges 9 are locked under flange 10 against outward movement of the heads after the molding has snapped past the tips of the gripping heads and the gripping heads engage the molding. Thus the gripping heads are locked against outward movement and this allows removal of stress, for example the bending load in a direction perpendicular to support plate 6, from elastic strips 3 and 4. That is, when the clamp is in position clamping molding 8 to support plate 6, flanges 9 underlie flanges 10 and outward movement of the gripping heads 1 and 2 is prevented by the engagement of the flanges.

In order to prevent jamming when flanges 9 are moved under flanges 10, the surfaces 13 on flanges 9 and the corresponding surfaces 14 of flanges 10 are slightly bevelled inwardly toward support plate 6. Also, a slight gap 15 is provided between the surfaces 13 and 14 in a natural unlocked state of the clamp, the spacing "s" of the gap between the flanges being such that, when the gripping heads 1 and 2 are displaced inwardly to their fullest extent, the opposite surfaces 13 and 14 make initial contact one with the other.

It will be appreciated from the foregoing description that the objects and advantages of the present invention are fully accomplished in that there is provided a novel and improved molding clamp which enables problem-free mounting of heavy moldings and secure fastening of the molding to a vehicle body. Particularly, this is afforded by using gripping heads attached to the base of the clamp by flexible elastic strips. The elastic support of the two gripping heads with respect to the base allows thick wall and heavy moldings to be pressed onto the clamps mounted on the sheet metal vehicle body readily and easily and with little force. This molding clamp furthermore is advantageous in that the molding may be mounted without difficulty even if the prepared fastening holes in the sheet metal body are not precisely aligned one with the other, whereby the edges of the gripping heads would be somewhat offset with respect to each other when the molding is secured thereto. This offset is absorbed within predetermined limits by the elasticity of the connecting strips. Also, the connecting strips are relieved of stress when the molding is secured to the clamp and support body by the interlocking of the flanges of the gripping heads and base. Consequently, the connection between the molding and the clamp is strong and secure.

The invention may be embodied in other specific forms wtihout departing from the spirit or essential characteristics thereof. The present embodiment is therefore to be considered in all respects as illustrative and not restrictive, the scope of the invention being indicated by the appended claims rather than by the foregoing description, and all changes which come within the meaning and equivalency of the claims are therefore intended to be embraced therein.

What is claimed and desired to be secured by United States Letters Patent is:

1. A clamp for securing molding to a support comprising a base;
   means carried by said base for securing the clamp to the support;
   a pair of heads carried by said base for gripping the molding, said heads being connected to said base on opposite sides thereof, and lying in a comon plane therewith and
   means for elastically connecting each of said heads and said base one to the other enabling movement of said heads towards said base against the bias of said elastic means upon application of the molding to the clamp and movement of said heads away from said base to subsequently grip the molding under the bias of said elastic means and thereby secure the molding to the support, said elastic means including a pair of elongated plastic strips connecting each of said heads and said base one to the other and lying in said plane, each of said strips including first and second substantially linearly extending portions angularly related one to the other enabling each strip to flex upon movement of the associated head toward and away from said base,
   said base, said heads and said elastic means being molded integrally of a plastic material.

2. A clamp according to claim 1 wherein each of said heads has a generally linearly extending edge for gripping the molding, said edges lying generally parallel to one another, the first linearly extending portion of each said strip extending from said base toward a side of the clamp between said heads with the second linearly extending portion of each said strip extending from the outer terminus of said first linearly extending portion toward the head to which it is connected.

3. A clamp according to claim 1 wherein the means for securing the clamp to the support includes a spreading rivet integrally molded with said base.

4. A clamp according to claim 1 including means carried by said heads and said base and cooperable therebetween for locking the heads against substantial movement in a direction generally normal to the plane.

5. A clamp according to claim 4 wherein said locking means includes a pair of outwardly directed flanges carried by said base in lateral opposition to said heads, respectively, and normally spaced from said heads, said flanges being spaced from the support to define a recess therebetween, each of said heads having an inwardly directed flange in lateral opposition to the corresponding recess, said head flanges being movable into said recesses upon application of the molding to the clamp for locking the heads, by engagement of the head flanges and the base flanges, against substantial movement in a direction generally normal to said plane.

6. A clamp for securing molding to a support comprising a base;
   means carried by said base for securing the clamp to the support,
   a pair of heads carried by said base for gripping the molding,
   means elastically connecting each of said heads and said base enabling the molding to move said heads toward said base against the bias of said elastic means upon application of the molding to the clamp and enabling the heads to subsequently grip the molding under the bias of said elastic means to secure the molding to the support,
   said base, said heads and said elastic means being molded integrally of a plastic material, said heads and said base lying in a common plane, and means carried by said heads and said base and cooperable therebetween for locking the heads against substantial movement in a direction generally normal to the plane.

7. A clamp according to claim 6 wherein said elastic means includes an elongated plastic strip connecting between each of said heads and said base and bent to enable the strip to flex upon movement of the associated head toward and away from said base.

8. A clamp according to claim 7 wherein said base and said heads lie in a common plane, said base having a pair of outwardly directed flanges in lateral opposition to said heads respectively and normally spaced from said heads, said flanges being spaced from the support to define a recess therebetween, each of said heads having an inwardly directed flange in lateral opposition to said recesses, said head flanges being movable into said recesses upon application of the molding to the clamp for locking the heads against substantial movement in a direction generally normal to said plane.

9. A clamp according to claim 6 wherein said locking means includes a pair of outwardly directed flanges carried by said base in lateral opposition to said heads, respectively, and normally spaced from said heads, said flanges being spaced from the support to define a recess therebetween, each of said heads having an inwardly directed flange in lateral opposition to the corresponding recess, said head flanges being movable into said recesses upon application of the molding to the clamp for locking the heads by engagement of the head flanges and the base flanges, against substantial movement in a direction generally normal to said plane.

10. A clamp for securing molding to a support comprising a base,
means carried by said base for securing the clamp to the support,
a pair of heads carried by said base for gripping the molding,
means for elastically connecting each of said heads and said base enabling the molding to move said heads toward said base against the bias of said elastic means upon application of the molding to the clamp and enabling the heads to subsequently grip the molding under the bias of said elastic means to secure the molding to the support,
said base, said heads and said elastic means being molded integrally of a plastic material and being connected to said base on the opposite sides thereof, said elastic means including a pair of elongated plastic strips connected between each of said heads and said base, each of said strips being bent to enable the strip to flex upon movement of the associated head toward and away from said base, each of said strips including first and second substantially linearly extending portions angularly related one to the other, each of said heads having a generally linearly extending edge for gripping the molding, said edges lying generally parallel to one another, the first linearly extending portion of each of said strips extending from the base toward the side of the clamp between said heads with the second linearly extending portion of each said strip extending from the outer terminus of said first linearly extending portion toward the head to which it is connected, said heads and said base lyin in a common plane, and means carried by said heads and said base and cooperable therebetween for locking the heads against substantial movement in a direction generally normal to the plane.

* * * * *

UNITED STATES PATENT AND TRADEMARK OFFICE
CERTIFICATE OF CORRECTION

PATENT NO. : 4,125,917
DATED : November 21, 1978
INVENTOR(S) : Guy Andre

It is certified that error appears in the above-identified patent and that said Letters Patent are hereby corrected as shown below:

On the first page under the heading "Foreign Application Priority Data" the date "Jun. 9, 1976" should be changed to --Jun. 12, 1976--.

Column 6, line 31 "lyin" should be changed to --lying--.

Signed and Sealed this

Sixth Day of November 1979

[SEAL]

Attest:

RUTH C. MASON
Attesting Officer

LUTRELLE F. PARKER
Acting Commissioner of Patents and Trademarks